(12) United States Patent
Ohira et al.

(10) Patent No.: US 6,707,565 B2
(45) Date of Patent: Mar. 16, 2004

(54) IMAGE OUTPUT DEVICE

(75) Inventors: Tadashi Ohira, Itami (JP); Toshikazu Kawaguchi, Kobe (JP); Hideyuki Kanbayashi, Sagamihara (JP); Tsutomu Yamazaki, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/181,914

(22) Filed: Oct. 29, 1998

(65) Prior Publication Data

US 2002/0075503 A1 Jun. 20, 2002

(30) Foreign Application Priority Data

Oct. 30, 1997 (JP) .............................................. 9-298135

(51) Int. Cl.[7] .............................................. G06F 15/00
(52) U.S. Cl. ...................... 358/1.15; 358/1.13; 358/1.14
(58) Field of Search ................................ 358/1.1, 1.12, 358/1.13, 1.14, 1.15, 405, 406, 407, 409, 401, 468, 434, 435, 436, 437, 438; 355/401; 399/8, 9, 18, 38, 70, 144

(56) References Cited

U.S. PATENT DOCUMENTS

| 5,377,016 A | * | 12/1994 | Kashiwagi et al. | 358/403 |
| 5,781,310 A | * | 7/1998 | Nakamura et al. | 358/468 |
| 5,847,857 A | * | 12/1998 | Yajima et al. | 358/468 |
| 5,982,509 A | * | 11/1999 | Ahn | 358/468 |

FOREIGN PATENT DOCUMENTS

JP 08336002 12/1996

\* cited by examiner

*Primary Examiner*—Mark Wallerson
(74) *Attorney, Agent, or Firm*—McDermott, Will & Emery

(57) ABSTRACT

An image output system having an image output device for performing a specified output process with respect to image data, and an image input device for providing the image data via reading an image from a document, or via an external device. Both the image input device and image output device have controllers for controlling the respective devices. The controller of the image output device outputs a reset signal to the system controller of the image input device when a response from the controller of the image input device is not appropriate, and continues to output the reset signal until a predetermined time elapses and the response from the controller of the image input device is judged to be appropriate.

18 Claims, 5 Drawing Sheets

IMAGE OUTPUT DEVICE

This application is based on application No. 09-298135 filed Oct. 30, 1997, in Japan, the content of which is hereby incorporated be reference.

TECHNICAL FIELD OF THE INVENTION

The present invention relates to an image output device for print-outputting (printing) or transmitting image information read from a document and image data received from an external device, which is applicable to a printer-copier, a printer with an image reader connected thereto or integrated therewith, a facsimile, and the like.

BACKGROUND OF THE INVENTION

In recent years, printer-copiers (including a combination model also functioning as a facsimile) have been used in an office area ("OA") network. On the other hand, a print system composed of a printer with an image reader connected thereto has also been used in practice because of its usability as a copier in which an image read from an original (document) is transferred directly to the printer and printed without the intervention of a computer. If an automatic document feeder (ADF) is used in such an image output device which selectively outputs the image read from the document or received from an external device (for printing or facsimile transmission), the operation of copying or transmitting a large number of documents can be performed with improved efficiency as in a commonly used copier.

In a conventional image output device, once a copy job operation is initiated in which an image is read from a placed document and outputted (for printing or transmission), the output of image data received from an external device is disabled till the completion of the copy job operation. Even during the execution of the copy job operation, however, the receipt of a print job in which an image is outputted from the external device, i.e., the process of receiving and temporarily storing data is performed.

SUMMARY OF THE INVENTION

If some trouble occurs during the reading of a document and disables the read operation, the conventional image output device is brought into a substantially non-operating state (system down), when viewed from the external device, and remains therein till the trouble is removed and the read operation is enabled. Unless the user promptly takes the proper measures, not only the copy job but also the print job stagnates. One type of potential trouble is the hang-up of a processor for controlling the image reader. In case of hang-up, the user is required to press a reset switch provided in the image reader. Although the reset operation is supposed to immediately cancel the hang-up of the processor and enable the read operation, the operation of resetting printer hardware or an instruction to reset printer software from the external device to the printer occasionally causes switching to an operational mode in which the print job is executed, so that the reading function is not used afterwards. Even when the processor is hung up, during a period which the read operation is not performed, an instruction to execute the copy job is not received after the hang-up of the processor so that the reading function remains unusable unless the reset operation is performed.

It is therefore an object of the present invention to minimize the duration of a period during which the read operation is disabled by promptly canceling the hang-up of the processor for controlling the reading of the document.

DETAILED DESCRIPTION OF THE PREFERRED EMBODIMENTS

Figure 1:
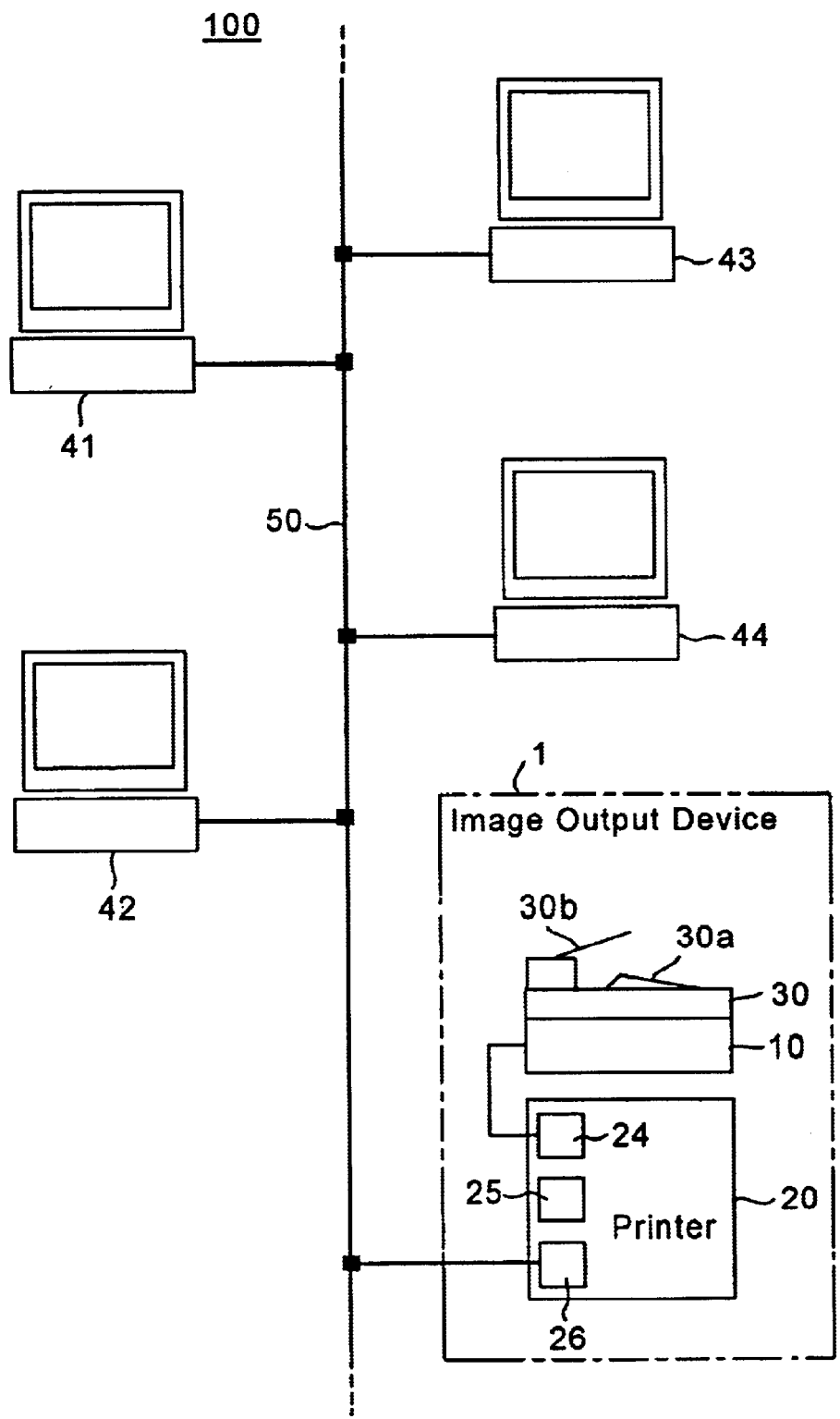
FIG. 1 shows the structure of a principal portion of a network according to the present invention.

FIG. 1 shows the structure of a principal portion of a network 100 according to the present invention.

The network 100 is a LAN in which a plurality of computers 41 to 44 use a printer 20 in common. The printer 20 is connected to a cable 50 via a network interface card (NIC) 26. The computer 41, which is among the plurality of computers 41 to 44, functions as a print server. The network 100 may also adopt a form in which a parallel port 25 is used to provide a connection between the printer 20 and the computer 41 so that the printer 20 is connected to the cable 50 via the computer 41.

An image reader 10 is connected to the printer 20 via a port 24 in a predetermined form. The image reader 10 is flat-type image inputting means which performs a line-by-line scanning operation with respect to the image of a document positioned on a document glass. The image reader 10 has an ADF (automatic document feeder) 30, also serving as a document cover, attached thereto. The document placed on a document feed tray 30a of the ADF 30 is fed onto the document glass of the image reader 10 and discharged onto a document discharge tray 30b after the scanning operation is completed. If an anterior side of the ADF 30 is raised in photocopying, e.g., a book, the whole ADF 30 rotates about the lower edge of the posterior side thereof serving as a spindle, so that the document glass of the image reader 10 is exposed. This indicates that the document may also be placed directly on the document glass.

In the present embodiment, the image reader 10, the ADF 30, and the printer 20 constitute an image output device 1 according to the present invention. The image output device 1 may be formed into a system in which a variety of separate devices are connected with cables or into a combination model into which individual functional units are integrated.

Figure 2:
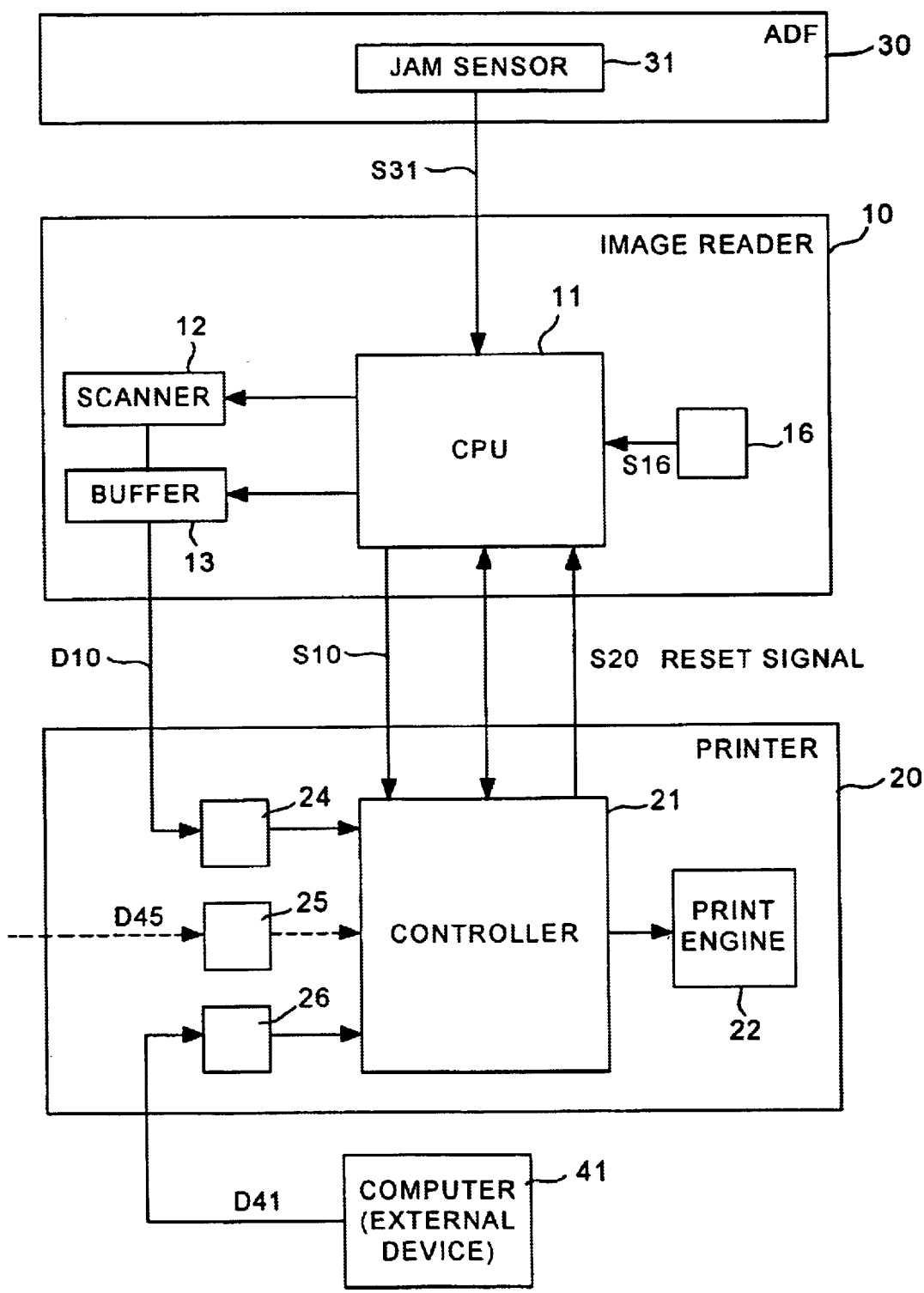
FIG. 2 is a functional block diagram of an image output device according to the present invention.

FIG. 2 is a functional block diagram of the image output device 1 according to the present invention.

The image reader 10 has a scanner 12 for scanning the image of the document and a buffer 13 for temporarily storing image data obtained as a result of scanning, which are controlled by a CPU as a control system of the present invention. The CPU 11 receives an ON-OFF signal S16 from a copy button 16 and a detect signal S31 from a jam sensor 31 provided in the ADF 30. When the copy button 16 is turned ON, the CPU 11 outputs a print request signal S10 to the printer 20 and initiates scanning. When the printer side is in the acceptable state, image data D10 obtained as a result of scanning is transferred from the image memory 13 to the printer 20.

In the printer 20, the image data D10 from the image reader 10, a print data D41 from the computer 41 as the external device, and print data D45 inputted to the parallel port is inputted to a controller 21 having a data processor. The print data D41, D45 is image information represented in a specified page description language. A print engine 22 receives image information properly processed by the controller 21. At this stage, the print data D41, D45 is subjected to command analysis and bit mapping. Input data from the outside is received (i.e., loading of the print job) not only during standby but also during the reading of the document (during the execution of the copy job). In the case of printing the image data D10 from the image reader 10, the image output device 1 performs a copy operation. In the case of printing the print data D41, D45, the image output device 1 performs a print operation.

The CPU 11 of the image reader 10 and the controller 21 of the printer 20 communicate with each other to process the print job and the copy job. For example, if a jam occurs during the copy operation to disable the read operation, the CPU 11 notifies the controller 21 of the disabled state. If the read operation is not performed properly, the controller 21 does not wait for the recovery of the reading function but frees the print engine 22 to the print job at the appropriate time, thereby preventing the stagnation of the print job. If there is no normal response from the CPU 11, the controller 21 judges that the CPU 11 is hung up, outputs a reset signal S20 instructing the CPU 11 to restart the control program, and normalizes the control of the image reader 10, which is a function exclusive to the present invention.

Figure 3:
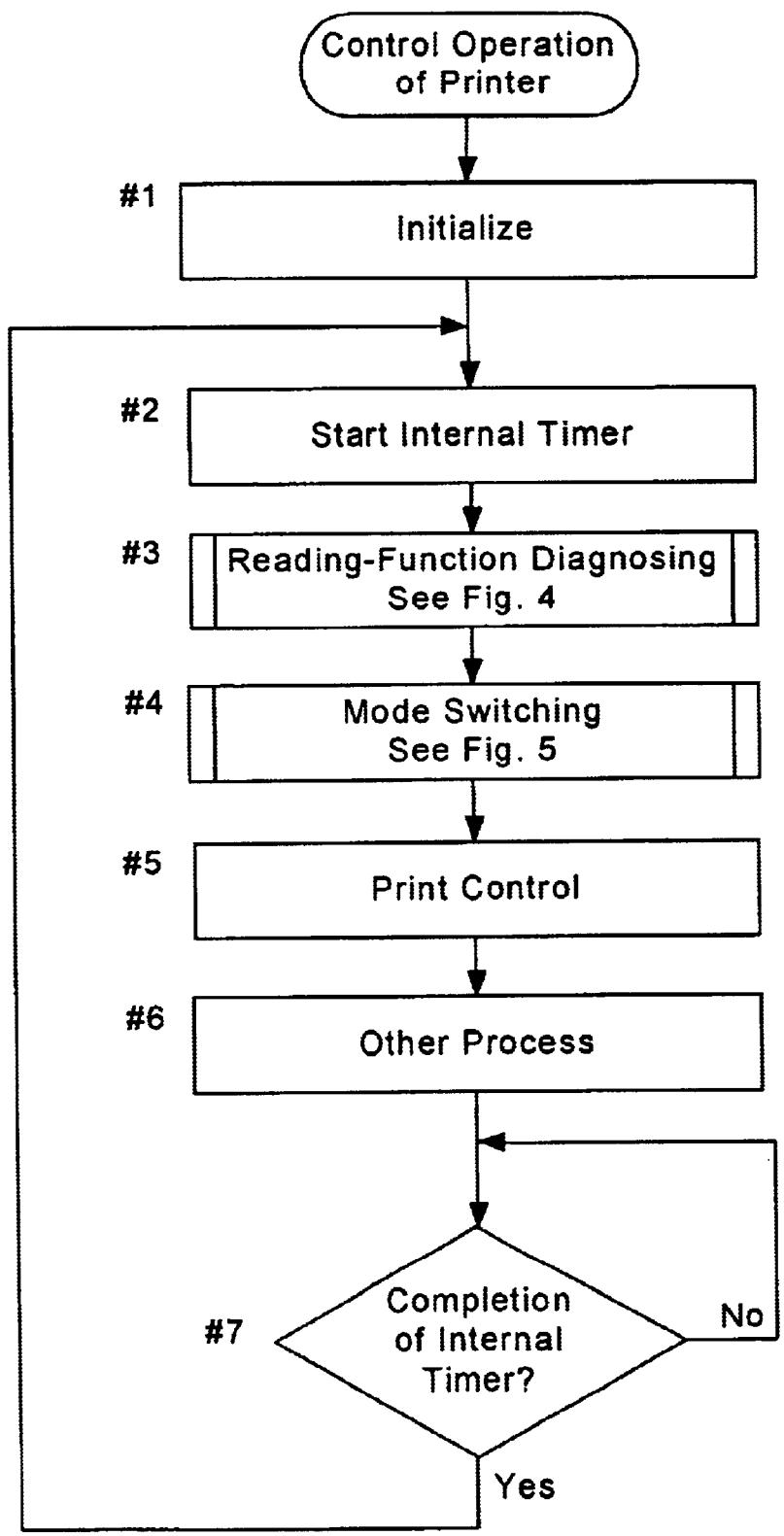
FIG. 3 is a main flow chart illustrating a control operation on the printer side.

FIG. 3 is a main flow chart illustrating a control operation on the printer side.

When the control program is initiated upon turning ON of the power or in response to the reset instruction, the controller 21 initializes various registers by clearing a specified memory and sets a default mode (#1). Subsequently, the controller 21 starts an internal timer defining a control routine time (#2). Thereafter, the controller 21 starts each of a reading-function diagnosing subroutine (#3), a mode switching subroutine (#4), a print control subroutine (#5), and an other process subroutine (#6). After the other process subroutine is completed, the whole process waits for the completion of the internal timer, returns to the step #2, and repeats the steps #2 to #7. The reset timer is timed by counting the number of executions of the routine, which will be described later.

Figure 4:
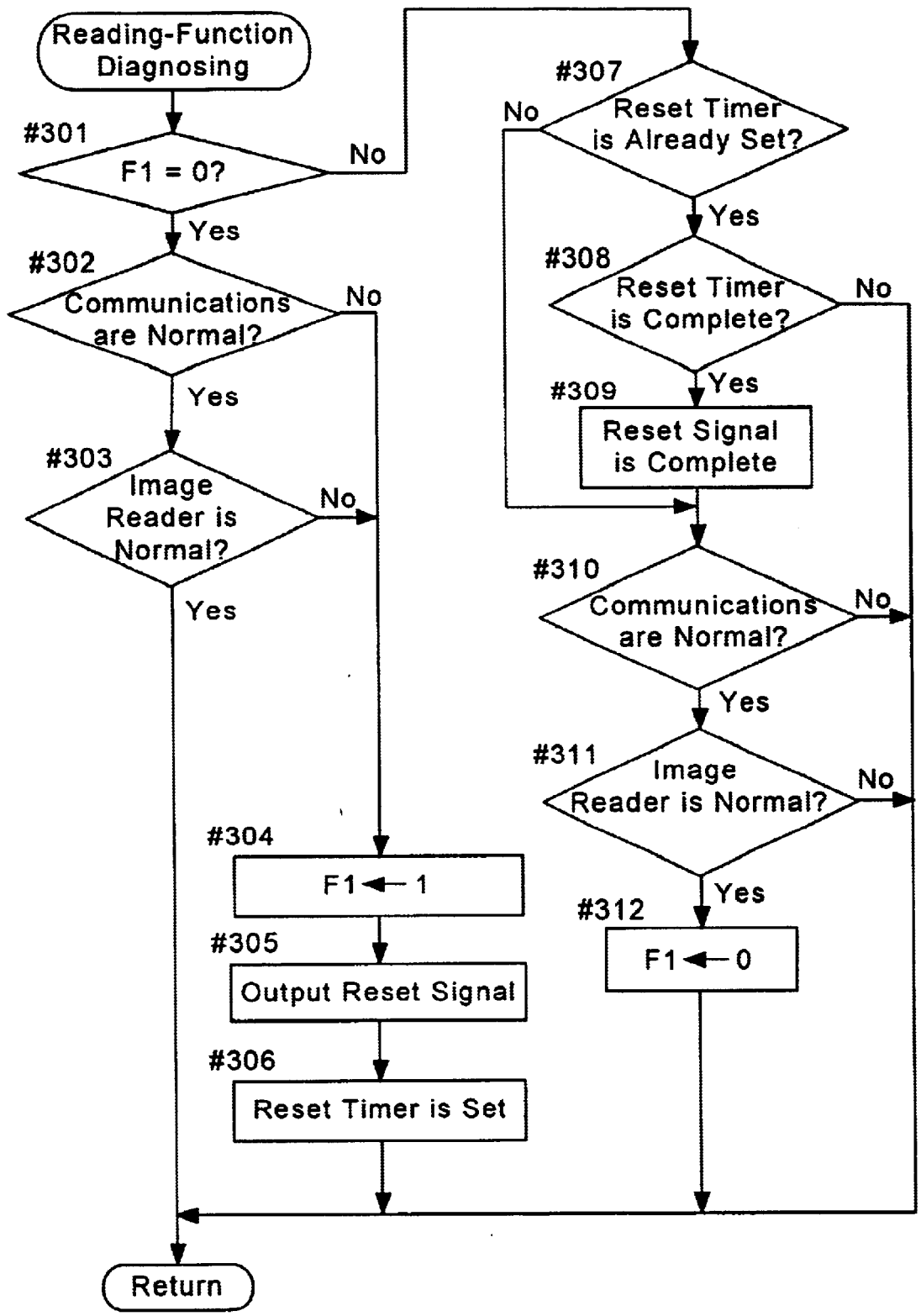
FIG. 4 is a flow chart illustrating the reading-function diagnosing subroutine.

FIG. 4 is a flow chart illustrating the reading-function diagnosing subroutine.

First, a flag F1 indicative of the image reader 10 in an abnormal state is checked (#301). If the flag F1 is OFF, it is judged whether communications between the image reader 10 and the CPU 11 are normal or not, i.e., whether there is a normal response or not (#302). When the communications are normal, it is subsequently judged whether there is a notification on abnormal reading from the CPU 11 or not (#303). If the function of reading the document is properly performed, the whole process immediately returns to the main routine. If there is no normal response from the CPU 11 due to the hang-up of the CPU 11 or the like, or if abnormal reading such as jam is reported, the flag F1 is set (#304) and a reset signal S20 is outputted to the CPU 11 (#305). Then, the reset timer for continually outputting the reset signal S20 over a given period is set (#306), whereby the whole process returns to the main routine.

On the other hand, if it is judged that the flag F1 is already ON in the step #301, the state of the reset timer is checked (#307, #308). If the timing of the reset timer is ongoing, the whole process returns. If the timing of the reset timer is completed, the output of the reset signal S20 is completed (#309) and the operating state of the image reader 10 is checked again (#310, #311). If such trouble as hang-up or jam is removed and the image reader 10 returns to the normal operating state, the flag F1 is turned OFF (#312). If it is judged that the reset timer has not been set in the step #307, the whole process proceeds to the step #310 where the operating state of the image reader 10 is checked.

In the main subroutine, the operating state of the image reader 10 is checked after the timing of the reset timer is completed. Since a certain rise time should elapse from the time when the control program is restarted in response to the reset signal S20 till the standby state is reached, the arrangement is for allowing the rise time to elapse. The arrangement prevents a collision between paper for the copy job and paper for the print job on a paper discharge tray resulting from the interruption of the print job during the rise time.

Figure 5:
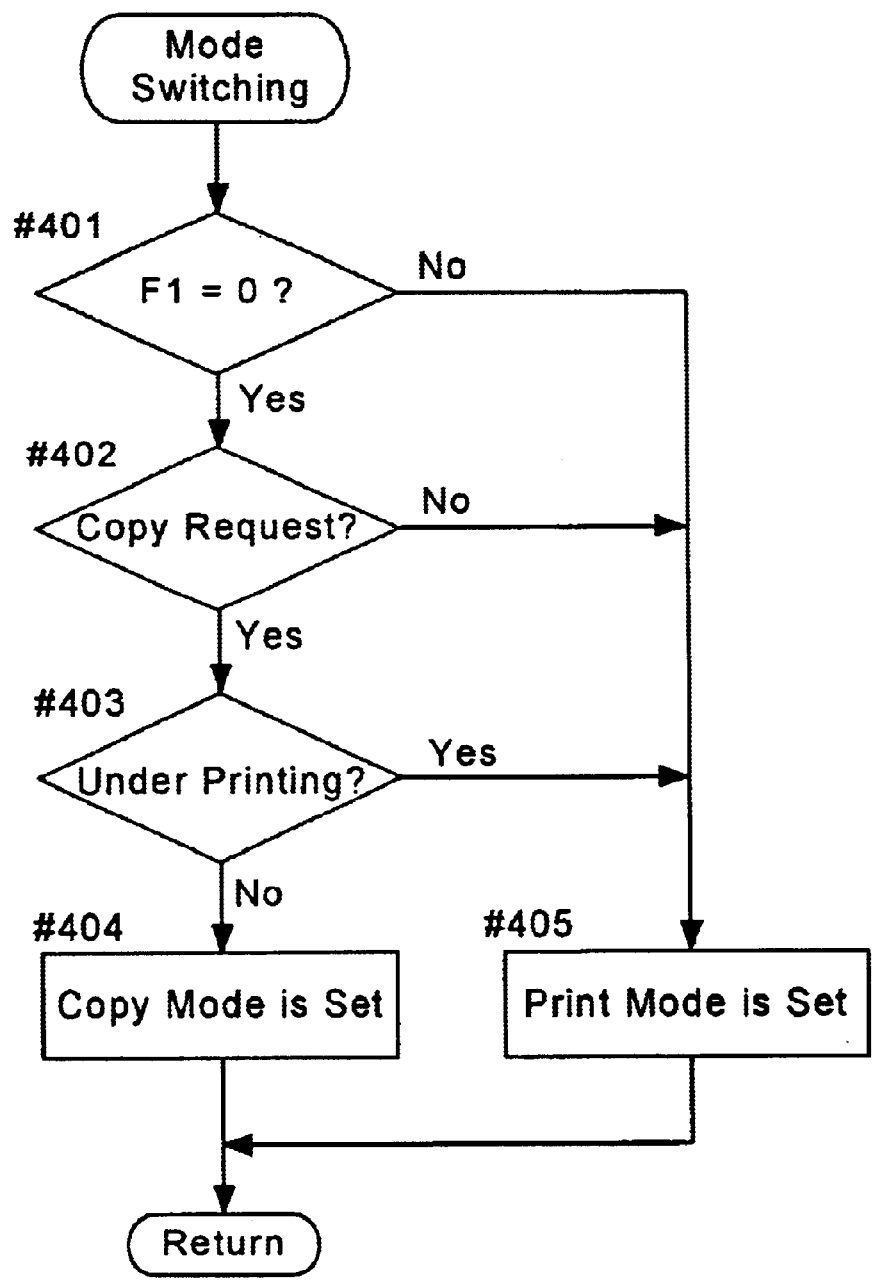
FIG. 5 is a flow chart illustrating the mode switching subroutine.

FIG. 5 is a flow chart illustrating the mode switching subroutine.

First, the flag F1 is checked (#401). If the flag F1 is OFF and the image reader 10 is in the normal operating state, a copy mode is set provided that there is a copy request from the image reader 10 and printing for the print job is not ongoing (#402 to #404).

On the other hand, a print mode is set if the flag F1 is ON (#401, #405). In other words, the print engine 22 is freed to the print job if the image reader 10 is in an abnormal operating state, which enables the print operation and prevents the stagnation of the print job even when the copy operation is disabled.

Even when the flag F1 is ON, the print mode is set if there is no copy request (#402, #405), which indicates that the normal mode is the print mode. Even when there is a copy request, the print mode is maintained if printing is ongoing (#403, #405) so that the print mode is switched to the copy mode at the breakpoint of the print job (on a job-by-job or page-by-page basis).

According to the foregoing embodiment, it is no longer necessary for the user to manually cancel the hang-up of the CPU 11. Since the reset timer allows the period during which the reset signal S20 is outputted to be sufficiently elongated, the CPU 11 can reliably recognize the reset instruction and restart the control program. When trouble occurs in the ADF 30 or image reader 10, the print mode is set so that the accumulation of print jobs during the recovery of the reading function is prevented.

In the foregoing embodiment, the image output device 1 may be a printer-copier into which the image reader 10 and the printer 20 are integrated. It is also possible to notify the printer 20 of not only a jam but also such trouble as a breakdown of the scanner 12 as a functional disorder. The present invention is also applicable to a facsimile for outputting an image read from a document or an image from an external device, such as a computer, to a public telephone network.

Effect of the Invention

The duration of a period during which a read operation is disabled can be minimized by promptly canceling the hang-up of the processor for controlling the reading of a document.

Even when abnormal reading occurs, the operational mode at the occurrence of abnormal reading is held for a given period of time, which prevents excessive impairment of usability in reading an image from a document and outputting the read image.

Of course, it should be understood that a wide range of modifications can be made to the exemplary embodiments described above. It is therefore intended that the foregoing detailed description be regarded as illustrative rather than limiting, and that it be understood that it is the following claims, including all equivalents, which are intended to define the scope of this invention.

What we claim is:

1. An image output system comprising:
   an image input device for providing image data from reading an image of a document;
   an image output device for performing an output process with respect to the image data from the image input device or from an external device;
   a first controller of said image input device for executing a control program; and
   a second controller of said image output device, wherein said second controller of said image output device outputs a reset signal to the first controller of said image input device to restart the control program when the second controller judges the first controller is hung up,
   the image output device or second controller has an operation mode of the image output device, and the operation mode includes a copy mode and a print mode, and
   the second controller sets the print mode when the second controller judges the first controller is hung up, wherein
   said second controller sets the print mode without receiving print instruction from the external device.

2. An image output device according to claim 1, wherein the control system of said image output device waits, when it outputs said reset signal during the reading of the document, till a predetermined time elapses from the outputting of said reset signal and judges whether or not a response from the control system of said image input device is appropriate.

3. An image output system according to claim 1, wherein the external device is one external device from a network comprising a plurality of external devices.

4. An image output system according to claim 1, wherein the image input device and the image output device is a single device.

5. An image output system according to claim 1, wherein the image input device and the image output device are separate devices.

6. The image output system according to claim 1, wherein said second controller of said image output device outputs a reset signal to the first controller of said image input device for a predetermined time period.

7. An image processing system comprising:
   an input device for reading an image of a document and providing image data, said input device having a first controller for executing a control program
   an output device for performing an output process with respect to the image data from said image input device or from an external device; and
   a second controller for outputting a reset signal to said first controller to restart the control program when the second controller judges the first controller is hung up,
   the output device or second controller has an operation mode of the output device, and the operation mode includes a copy mode and a print mode, and
   the second controller sets the print mode when the second controller judges the first controller is hung up, wherein said second controller sets the print mode without receiving print instruction from the external device.

8. An image output system according to claim 7, wherein the external device is one external device from a network comprising a plurality of external devices.

9. An image output system according to claim 7, wherein the image input device and the image output device is a single device.

10. An image output system according to claim 7, wherein the image input device and the image output device are separate devices.

11. The image output system according to claim 7, wherein the second controller outputs the reset signal to said first controller for a predetermined time period.

12. A method of processing images from an image processing system comprising the steps of:
    providing image data from an image input device by reading an image of a document;
    performing an output process with an image output device, with respect to image data from the image input device or from an external device;
    executing a control program via a control system of the image input device; and
    outputting a reset signal to the control system of said image input device instructing the control system of said image input device to restart the control program when a control system of the image output device judges the control system of the input device is hung up, wherein
    the image output device or control system of the image output device has an operation mode of the image output device, and the operation mode includes a copy mode and a print mode,
    the control system of the image output device sets the print mode when the control system of the image output device judges the control system of the input device is hung up, and
    said control system sets the print mode without receiving print instruction from the external device.

13. A method of processing images from an image processing system according to claim 12, further comprising the steps of:
    having the control system of said image output device wait, when it outputs said reset signal during the reading of the document, till a predetermined time elapses from the outputting of said reset signal; and
    having the control system of said image output device judge whether or not a response from the control system of said image input device is appropriate.

14. A method of processing images from an image processing system according to claim 12, wherein the image input device and the image output device is a single device.

15. A method of processing images from an image processing system according to claim 12, wherein the image input device and the image output device are separate devices.

16. A method of processing images from an image processing system according to claim 12, wherein the external device is one external device from a network comprising a plurality of external devices.

17. A method of processing images from an image processing system according to claim 13, wherein the external device is one external device from a network comprising a plurality of external devices.

18. The method of processing images from an image processing system according to claim 12, wherein the reset signal is output to the control system of said image input device for a predetermined time period.

* * * * *